US008236362B2

(12) United States Patent
Cale et al.

(10) Patent No.: US 8,236,362 B2
(45) Date of Patent: *Aug. 7, 2012

(54) HEAT-STABLE CONCENTRATED MILK PRODUCT

(75) Inventors: Kenneth William Cale, Suffern, NY (US); George W. Haas, Mount Prospect, IL (US); Jamie Allen Hestekin, Morton Grove, IL (US); Heather Marie Hudson, San Diego, CA (US); Ted Riley Lindstrom, Punta Gorda, FL (US); Yinqing Ma, Bethesda, MD (US); Fu-I Mei, Wheeling, IL (US); Danielle Elizabeth Perkins, Clarendon Hills, IL (US); Charles Wang, White Plains, NY (US)

(73) Assignee: Kraft Foods Global Brands LLC, Northfield, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/005,305

(22) Filed: Jan. 12, 2011
(Under 37 CFR 1.47)

(65) Prior Publication Data

US 2011/0104344 A1 May 5, 2011

Related U.S. Application Data

(63) Continuation of application No. 11/186,543, filed on Jul. 21, 2005, now Pat. No. 7,887,864.

(60) Provisional application No. 60/679,267, filed on May 9, 2005, provisional application No. 60/590,696, filed on Jul. 23, 2004.

(51) Int. Cl.
*A23C 3/00* (2006.01)
(52) U.S. Cl. ............ 426/330.2; 426/491; 426/522; 426/580
(58) Field of Classification Search ............ 426/330.2, 426/490, 491, 492, 520, 521, 522, 573, 580, 426/583, 587, 654
See application file for complete search history.

(56) References Cited

U.S. PATENT DOCUMENTS

| | | | |
|---|---|---|---|
| 2,334,317 A | 11/1943 | Crighton | |
| 2,860,053 A | 11/1958 | Avera | |
| 2,860,057 A | 11/1958 | Wilcox | |
| 3,210,201 A | 10/1965 | Tumerman et al. | |
| 3,348,955 A | 10/1967 | Stewart, Jr. | |
| 4,282,262 A | 8/1981 | Blake | |
| 4,529,611 A | 7/1985 | Uiterwaal | |
| 5,356,640 A | 10/1994 | Jameson et al. | |
| 5,503,865 A | 4/1996 | Behringer et al. | |
| 5,766,666 A | 6/1998 | Streiff et al. | |
| 6,060,105 A | 5/2000 | Meister et al. | |
| 6,887,505 B2 | 5/2005 | Reaves et al. | |
| 6,921,548 B2 | 7/2005 | McCampbell | |
| 7,026,004 B2 | 4/2006 | Loh et al. | |
| 7,285,301 B2 | 10/2007 | McCampbell | |
| 2001/0026825 A1 | 10/2001 | Reaves et al. | |
| 2003/0054079 A1 | 3/2003 | Reaves et al. | |
| 2004/0067296 A1 | 4/2004 | Loh et al. | |
| 2004/0251202 A1 | 12/2004 | Yen et al. | |
| 2005/0181092 A1 | 8/2005 | Achs | |
| 2006/0040025 A1 | 2/2006 | Souppe | |
| 2006/0073256 A1 | 4/2006 | Destaillats et al. | |
| 2007/0172548 A1 | 7/2007 | Cale et al. | |

FOREIGN PATENT DOCUMENTS

| | | |
|---|---|---|
| CH | 486 208 A | 2/1970 |
| CN | 101026963 A | 8/2007 |
| DE | 2 413 193 A1 | 10/1974 |
| EP | 0 316 938 A2 | 5/1989 |
| EP | 0 788 313 A1 | 8/1997 |
| EP | 1 407 673 A1 | 4/2004 |
| EP | 1 389 914 B1 | 9/2006 |
| GB | 1 438 533 A | 6/1976 |
| JP | 10-056962 A | 3/1998 |
| JP | 10-113122 A | 5/1998 |
| JP | 2000-102344 A | 4/2000 |
| JP | 2002-000291 A | 1/2002 |
| JP | 2005-185151 A | 7/2005 |
| WO | 87/06797 A1 | 11/1987 |
| WO | 92/21245 A1 | 12/1992 |
| WO | 00/64267 A1 | 11/2000 |
| WO | 03/090545 A1 | 11/2003 |
| WO | 2006/012506 A1 | 2/2006 |

OTHER PUBLICATIONS

European Patent Office Extended European Search Report for European Application No. 09167573.6 dated May 3, 2011 (14 pages).
H. K. Wilson and E. O. Herreid, Controlling oxidized flavours in high-fat sterilized creams, Journal of Dairy Science, 1969, 52 (8),1229-32, Abstract from Dialog(R) File 51: Food Sci. & Tech. Abs, 1 page.

(Continued)

*Primary Examiner* — Leslie Wong
(74) *Attorney, Agent, or Firm* — Fitch, Even, Tabin & Flannery, LLP

(57) ABSTRACT

The invention provides a stable concentrated dairy liquid, such as concentrated milk, with improved flavor, color, and mouthfeel, and a method of production thereof. The method utilizes specific thermal treatments to produce the stable concentrated dairy liquid to which a stabilizer and mouthfeel enhancer are added. The resulting products have a sterilization value $F_o$ of at least 5 that is also resistant to gelling and browning during high temperature sterilization and is also resistant to gelling and browning during storage for greater than six months. The method balances such thermal treatments with addition of stabilizer and enhancer to achieve the desired flavor/mouthfeel and sterilization and to achieve reduced level of soluble protein in the concentrated milk prior to concentration to resist gelation and minimize browning. Moreover, such processing may be utilized in a milk that is concentrated to a factor of 2.7 fold or higher and contains at least 8.5 percent protein.

36 Claims, 3 Drawing Sheets

OTHER PUBLICATIONS

D. M. Santos et al., Sandiness and other problems in doce de leite, Boletim do Instituto de Tecnologia de Alimentos, 1977, (52), 61-80, Abstract from Dialog(R) File 50: CAB Abstracts, 1 page.

Harwalkar et al., Effect of added Phosphates and storage on changes in ultra-high temperature short-time sterilized concentrated skim-milk. 1. Viscosity, gelation, alcohol stability, chemical and electrophoretic analysis of proteins, Neth. Milk Dairy J., 32 (1978) pp. 94-111.

A. W. Sweetsur and D. D. Muir, The use of permitted additives and heat treatment to optimise the heat stability of skimmed milk and concentrated skim milk, Journal of the Society of Dairy Technology, 1980, 33 (3), 101-5, Abstract from Dialog(R) File 53: Foodline(R): Science, 1 page.

A. W. M. Sweetsur et al., Effect of concentration by ultrafiltration on the heat stability of skim-milk, Journal of Dairy Research, 47, No. 3 (1980) pp. 327-335.

A. W. M. Sweetsur and D. D. Muir, Natural variation in heat stability of concentrated milk before and after homogenization, Journal of the Society of Dairy Techhnology, 1982, vol. 35 (4), 120-126, Abstract from Dialog(R) File 50: CAB Abstracts, 1 page.

A. W. M. Sweetsur and D. D. Muir, Manipulation of the heat stability of homogenised concentrated milk, Journal of the Society of Dairy Technology, 1982, vol. 35 (4), 126-32, Abstract from Dialog(R) File 53: Foodline(R): Science, 1 page.

E. R. B. Graham, The effect of different factors on the viscosity of concentrated milk, XXI International Dairy Congress, 1982, vol. 1, Book 2, p. 45, Abstract from Dialog(R) File 50: CAB Abstracts, 1 page.

D. D. Muir, The influence of some inorganic salts on the heat stability of 40% solids concentrated skim milk, XXI International Dairy Concgress, 1982, vol. 1, Book 2, p. 86, Abstract from Dialog(R) File 50: CAB Abstracts, 1 page.

J. S. Sindhu, Influence of sodium phosphate on the heat stability of buffalo milk and its concentrate, Journal of Food Processing and Preservation, 1985, 9 (2), 57-64, Abstract from Dialog(R) File 51: Food Sci. & Tech. Abs, 1 page.

A. W. M. Sweetsur et al., Optimization of the heat stability of concentrated milks prepared by ultrafiltration, Milchwissenschaft, 40, No. 6 (1985) pp. 334-337.

J. A. Blais et al., Concentrated milks and milk powder, Presses de L'Universite Laval, 1985, 280-314, Abstract from Dialog(R) File 53: Foodline(R): Science, 1 page.

J. S. Sindhu and M. Tayal, Influence of stabilizers on the salt balance of pH of buffalo milk and its concentrate, Journal of Food Technology, 1986, 21 (3), 331-7, Abstract from Dialog(R) File 53: Foodline(R): Science, 1 page.

J. A. Nieuwenhuijse et al., Calcium and phosphate partitions during the manufacture of sterilized concentrated milk and their relations to the heat stability, Netherlands Milk and Dairy Journal, 1988, 42 (4), 387-421, Abstract from Dialog(R) File 51: Food Sci. & Tech. Abs, 1 page.

Venkatachalam et al., Effect of lactose concentration on age gelation of UHT sterilized skim milk concentrate, Journal of Dairy Science, 74 (Aug. 1991) pp. 12-15.

McMahon et al., Effects of Phosphate and Citrate on the Gelation Properties of Casein Micelles in Renneted Ultra-High Temperature (UHT) Sterilized Concentrated Milk, Food Structure, 10 (1991) pp. 27-36.

J. A. Nieuwenhuijse, Heat stability of concentrated skim milk, Netherlands Milk and Dairy Journal, 1993, 47 (1), 51-53, Abstract from Dialog(R) File 53: Foodline(R): Science, 1 page.

El-Din et al., Polymerization of Casein on Heating Milk, Int. Dairy Journal, 3 (1993) pp. 581-588.

J. E. Schraml et al., Effects of composition and concentration of dairy liquids on fouling structure, Milchwissenschaft, 1996, 51 (11), 607-611, Abstract from Dialog(R) File 53: Foodline(R): Science, 1 page.

Hinrichs et al., Ultrahocherhitzen von Milchkonzentraten, Deutsche Milchwirtschaft, 48 (1997) pp. 185-188.

Athina Tziboula et al., Microfiltration of milk with ceramic membranes: Influence on casein composition and heat stability, Milchwissenschaft, 53 (1) 1998 pp. 8-11.

Jay, High Temperature Food Preservation and Characteristics of Thermophillic Microorganisms, Modern Food Microbiology, Ch. 16, (1998) Aspen Publishers, NY, 23 pages.

Cano-Ruiz et al., Changes in Physicochemical Properties of Retort-Sterilized Dairy Beverages During Storage, J. Dairy Sci. 81 (1998) pp. 2116-2123.

DeMan, Principles of Food Chemistry, 3rd Ed. 1999, p. 272.

E. Mann, Recombined milk, Dairy Industries International, Feb. 2001, 66 (2), 15-16, Abstract from Dialog(R) File 53: Foodline(R): Science, 1 page.

Datta et al., Age Gelation of UHT Milk-A Review, Trans IChemE, 79 (Dec. 2001) pp. 197-210.

Udabage et al., Effects of Mineral Salts and Calcium Chelating Agents on the Gelation of Renneted Skim Milk, J. Dairy Sci., 84 (2001) pp. 1569-1575.

R. Mizuno and J. A. Lucey, Effects of emulsifying salts on the turbidity and calcium-phosphate-protein interactions in casein micelles, Journal of Dairy Science, Sep. 2005, 88 (9) 3070-3078, Abstract from Dialog(R) File 53: Foodline(R): Science, 1 page.

Fundamentals of Dairy Chemistry, 3rd Ed., Chapter 2, p. 43.

Japan Patent Office, Official Notice of Rejection for Japanese Patent Application No. 2007-522798 dated Dec. 22, 2009 with English Translation, 6 pages.

European Patent Office Communication of a Notice of Opposition dated Feb. 24, 2011, Notice of Opposition by Friesland Brands B.V. to European Patent EP 1 618 790 B1, 14 pages.

HEAT-STABLE CONCENTRATED MILK PRODUCT

RELATED APPLICATIONS

This application is a continuation of prior application Ser. No. 11/186,543, filed Jul. 21, 2005, issued as U.S. Pat. No. 7,887,864 on Feb. 15, 2011, which claims benefit of U.S. Provisional Application 60/590,696, filed Jul. 23, 2004, and U.S. Provisional Application 60/679,267, filed May 9, 2005, all of which are hereby incorporated by reference in their entireties.

FIELD OF THE INVENTION

This invention relates to concentrated dairy products. More specifically, this invention relates to non-gelling, non-browning, organoleptically pleasing, concentrated dairy products, such as concentrated milk, and methods for producing the same.

BACKGROUND OF THE INVENTION

Liquid dairy products, such as milk, may be thermally processed to increase their stability. Unfortunately, thermally treating milk often results in color changes and/or gelation during processing or extended storage. For example, lactose in milk heated to high temperatures tends to interact with proteins and results in an unsightly brown color. This undesired condition is often referred to as "browning" or a "browning reaction." Gelation, on the other hand, is not completely understood, but the literature suggests that gels may form, under certain conditions, as a three-dimensional protein matrix formed by the whey proteins. See, e.g., Datta et al., "Age Gelation of UHT Milk—A Review," Trans. IChemE, Vol. 79, Part C, 197-210 (2001). Both gelation and browning are undesirable in milk since they impart objectionable organoleptic properties. Although a limited amount of browning can be accepted, it is preferred that no gelation or protein aggregation is visible.

The concentration of milk is often desired because it allows for smaller quantities to be stored and transported, thereby resulting in decreased storage and shipping costs, and may allow for the packaging and use of milk in more efficient ways. However, the production of an organoleptically-pleasing, highly concentrated milk can be difficult, because the concentration of milk generates even more pronounced problems with gelation and browning. For instance, milk that has been concentrated at least three fold (3×) has an even greater tendency to undergo protein gelation and browning during its thermal processing. Additionally, such concentrated milk also has a greater tendency to separate and form gels over time as the product ages, thereby limiting the usable shelf life of the product. Concentrated milk, as a result, is generally limited to concentrations below about 25 percent total solids, protein levels below about 7 percent, and a shelf life of less than 6 months.

Numerous studies have been reported on gelation and browning of milk and concentrated milk and many factors affecting gelation in milk have been identified. Examples of such factors include calcium (chelation and/or removal), mode and severity of thermal treatment, proteolysis, milk production factors, microbiological quality of raw milk, storage temperature and time, additives, fat content, pH, and the polymerization of casein. See, e.g., Udabage et al., "Effects of Mineral Salts and Calcium Chelating Agents on the Gelation of Renneted Skim Milk," 84:1569-1575 (2001); Cano-Ruiz et al., "Changes in Physicochemical Properties of Retort-Sterilized Dairy Beverages During Storage," J. Dairy Sci. 81:2116-2123 (1998); El-Din et al., "Polymerization of Casein on Heating Milk," Int. Dairy J. 3:581-588 (1993); McMahon et al., "Effects of Phosphate and Citrate on the Gelation Properties of Casein Micelles in Renneted Ultrahigh Temperature (UHT) Sterilized Concentrated Milk," Food Structure, Vol. 10, 27-36 (1991); Harwalkar et al., "Effect of Added Phosphates and Storage on Changes in Ultra-High Temperature Show Time Sterilized Concentrated Skim Milk. 1. Viscosity, Gelation, Alcohol Stability, Chemical and Electrophoretic Analysis of Proteins," Neth. Milk Dairy J. 32:94-111 (1978).

The production of concentrated milk, also known as evaporated milk, is known in the art and may be produced from whole milk, partly skimmed milk, or skim milk. Unfortunately, as noted above, the concentration and shelf life of typical concentrated milk may be limited due to gelation and browning problems. Typically, as noted above, concentrated milk products are limited to less than 25 percent total solids, less than 7 percent protein, and have shelf lives of less than 12 months, and often significantly less, due to age gelation.

A typical method of producing concentrated milk involves multiple heating steps in combination with the concentration of the milk. For example, one general method used to produce concentrated milk involves first standardizing the milk to a desired ratio of solids to fat and then forewarming the milk to reduce the risk of the milk casein from coagulating during later sterilization. Forewarming also decreases the risk of coagulation taking place during storage prior to sterilization and may further decrease the initial microbial load. The forewarmed milk is then concentrated by evaporation, ultrafiltration, or other appropriate methods to the desired concentration. The milk may be homogenized, cooled, restandardized, and packaged. In addition, a stabilizer salt may be added to help reduce the risk of coagulation of the milk that may occur at high temperatures or during storage. Either before or after packaging, the product is sterilized. Sterilization usually involves either relatively low temperatures for relatively long periods of time (e.g., about 90 to about 120° C. for about 5 to about 30 minutes) or relatively high temperatures for relatively short periods of time (e.g., about 135° C. or higher for a few seconds).

The degree of sterilization or the sterilization value ($F_o$) is based on the time that the dairy product is subjected to specific temperatures and is a culmination of all thermal treatments that the product encounters during processing. Consequently, a desired sterilization value may be achieved through a variety of processing conditions. Typically, concentrated milk is sterilized to a $F_o$ of at least 5 and preferably to a much higher level (e.g., 15 or higher). Unfortunately, as discussed above, high temperatures or long exposures to elevated temperatures, as are generally necessary in conventional sterilization methods to achieve the desired sterilization values, also adversely affect the long term stability of concentrated milk, especially concentrated milk with greater than about 7 percent protein, by inducing gelation or browning.

The sterilization value for a sterilization process can be measured using graphical integration of time-temperature data during the food's slowest heating point rate curve for the thermal process. This graphical integration obtains the total lethality provided to the product. To calculate the processing time required to achieve a desired $F_o$ using the graphical method, a heat penetration curve (i.e., a graphical plot of temperature versus time) at the slowest heating location of the food is required. The heating plots are then subdivided into small time increments and the arithmetic mean temperature for each time increment is calculated and used to determine lethality (L) for each mean temperature using the formula:

$$L=10^{(T-121)/z}$$

Where:
T=arithmetic mean temperature for a small time increment in ° C.;
z=standardized value for the particular microorganism; and
L=lethality of a particular micro-organism at temperature T.

Next, the lethality value calculated above for each small time increment is multiplied by the time increment and then summed to obtain the sterilization value ($F_o$) using the formula:

$$F_o=(t_{T1})(L_1)+(t_{T2})(L_2)+(t_{T3})(L_3)+\ldots$$

Where:
$t_{T1}, t_{T2}, \ldots$ =Time increment at temperature T1, T2, ...;
$L_1, L_2, \ldots$ =Lethality value for time increment 1, time increment 2, ...; and
$F_o$=Sterilization value at 121° C. of a microorganism.

Consequently, once a penetration curve is generated, the sterilization value $F_o$ for the process can be computed by converting the length of process time at any temperature to an equivalent process time at a reference temperature of 121° C. (250° F.). Jay, 1998, "High Temperature Food Preservation and Characteristics of Thermophilic Microorganisms," in Modern Food Microbiology (D. R. Heldman, ed.), ch. 16, New York, Aspen Publishers.

Various approaches for the production of concentrated milk have been documented. For example, Wilcox, U.S. Pat. No. 2,860,057, discloses a method to produce a concentrated milk using forewarming, pasteurizing, and high-temperature, short-term sterilization after concentration. Wilcox teaches the concentration of milk to approximately 26 percent solids using forewarming at about 115° C. (240° F.) for about 2 minutes prior to concentration, preheating at 93° C. (200° F.) for about 5 minutes after concentration, and sterilization at about 127 to 132° C. (261 to 270° F.) for 1 to 3 minutes.

Blake, U.S. Pat. No. 4,282,262, is directed to a method to produce dairy based mixes for frozen desserts. Blake discloses a milk-blend fraction comprising a specially prepared concentrated blend of milk, sugar, stabilizer salts, and casein-reactive gums. Blake teaches the concentration of a milk having between about 1 to 9 percent fat and added stabilizer salts to about 25 to 36 percent total solids, after which the various other components are blended therein. Initially, forewarming is continued until the milk has a standard whey protein nitrogen test ranging from 4.5 to 5.5. The concentrated milk blend is then sterilized by heating at 104 to 148° C. (220 to 300° F.) for 1 to 8 seconds.

Reaves et al., U.S. Patent Publication 20030054079 (Mar. 20, 2003), discloses a method of producing an ultra-high temperature milk concentrate having 30 to 45 percent nonfat milk solids. Reaves et al. teach the preheating of milk for 10 minutes at 65° C. (150° F.) to produce a preheated, milk starting product, which is then pasteurized at 82° C. (180° F.) for 16 to 22 seconds and evaporated under elevated pasteurizing temperatures (i.e., 10 minutes at 62° C. (145° F.) under vacuum) to produce an intermediate, condensed liquid milk. A cream and stabilizer, such as sodium hexametaphosphate or carrageenan, are added to the intermediate milk, which is then ultrapasteurized in two stages wherein the first stage is at 82° C. (180° F.) for 30 to 36 seconds and second stage is at 143° C. (290° F.) for 4 seconds. Shelf lives of 30 days to 6 months are reported for the resulting milk concentrate.

As indicated, concentrated milks require thermal processing to sterilize. The use of such elevated temperatures and increased exposure to such temperatures are factors that may contribute to undesirable properties in the milk, such as gelation and browning. Unfortunately, higher concentrations, such as protein levels greater than about 7 percent that are desired for efficiency and logistical standpoints, often make these undesirable conditions even more pronounced and difficult to avoid. Consequently, there is a desire for improved concentrated milks (generally 3× or higher and containing more than 7 percent protein) that are non-gelling and non-browning for greater than about 6 months storage at ambient conditions. There is also a desire for improved methods to produce such concentrated milks using a thermal treatment sufficient to sterilize and at the same time prevent gel formation and minimize browning. The present invention provides such compositions and methods.

SUMMARY OF THE INVENTION

The invention is directed to a stable concentrated dairy liquid, such as concentrated milk, and a method of production thereof. The stable concentrated dairy liquid comprises a dairy liquid containing at least about 8.5 percent protein, wherein the protein comprises serum protein and casein protein, wherein the dairy liquid is forewarmed prior to concentration, wherein ultrafiltration, with or without diafiltration, is used to concentrate the dairy liquid, wherein certain components (i.e., stabilizers and mouthfeel enhancers) are added back to the concentrated dairy liquid after concentration, and wherein the resulting product is subjected to a heat treatment (e.g., retorting) to achieve a $F_o$ value of at least 5. Generally, the resulting concentrated dairy liquid is concentrated about 2.7 fold or higher, preferably about 3 fold or higher, and more preferably about 4 fold or higher; if desired, the resulting concentrated dairy liquid may be standardized prior to achieve a more uniform and consistent concentration level over the same and/or different production runs. Furthermore, the resulting concentrated dairy liquid has a sterilization value $F_o$ of at least 5 (preferably at least about 6.5 and more preferably at least about 7.5), and is resistant to gel formation and browning during both high temperature processing conditions and ambient storage conditions for at least 6 months (preferably at least about 9 months and more preferably at least about 12 months). In preferred embodiments, the $F_o$ value is about 5 to about 10. Especially preferred concentrated dairy liquids include 3× to 5× concentrates having at least about 8.5 percent protein, in another aspect at least about 8.8 percent protein, and in another aspect at least about 9 percent protein.

The method to produce such stable concentrated dairy liquid utilizes specific thermal treatments to produce a stable dairy liquid, which is concentrated to at least 2.7 fold and preferably to at least 3 fold. The method also produces a dairy liquid having a sterilization or $F_o$ value of at least 5 (preferably at least about 6.5 and more preferably at least about 7.5) that is also resistant to gelling and browning during high temperature treatment of sterilization and during storage under ambient conditions for greater than 6 months (preferably at least about 9 months and more preferably at least about 12 months). The method balances such thermal treatments to achieve the desired sterilization and, at the same time, to achieve sufficient crosslinking of serum protein in the concentrated milk to resist gelation and minimize browning reactions; the addition of certain components (i.e., stabilizers and mouthfeel enhancers) after ultrafiltration step improves stability and significantly enhances mouthfeel and other organoleptic properties. Indeed, mouthfeel and other organoleptic properties are very close to the starting dairy liquid.

The dairy liquid is forewarmed prior to concentration in order to provide a more stable concentrated final product. Generally, the forewarming comprises treating the starting dairy liquid to a temperature and for a time effective to provide a reduced amount of soluble protein. For purposes of this invention, "a reduced amount of soluble protein" is a reduction in soluble protein of greater than about 25 percent, preferably about 50 to 95 percent, and more preferably about 70 to about 90 percent prior to the concentration step; this reduction is determined taking the protein level at a pH of 4.6 before forewarming step as 100 percent and measuring the protein level after the forewarming step. It is generally referred to as "pH 4.6 soluble protein." Forewarming can be carried out at temperatures as low as about 60° C. although longer times (e.g., greater than several hours) will be required; preferably temperatures greater than about 70° C. are used to reduce the forewarming period required. For example, effective forewarming of the starting dairy liquid can be carried out at a temperature of about 70 to about 100° C. for about 0.5 to about 20 minutes, and preferably at about 85 to about 95° C. for about 2 to about 6 minutes. In another embodiment, the forewarming is carried out in a two-stage process comprising a first stage at about 80 to about 100° C. for about 2 to about 6 minutes followed by a second stage at about 100 to about 130° C. for about 1 to about 60 seconds. Although not wishing to be limited by theory, it is believed that the serum proteins are predominately crosslinked to the outer surfaces of the casein protein micelles and/or otherwise form aggregates, thereby reducing the soluble protein. Moreover, such processing allows the production of shelf stable concentrated milk having 8.5 or more percent protein; indeed, shelf stable concentrated milk products having up to about 13 or 14 percent protein have been produced using the methods of this invention.

The present invention includes a method of making a stable concentrated dairy liquid, said method comprising: (1) providing a dairy liquid containing serum proteins and casein proteins; (2) forewarming the dairy liquid at a temperature of at least about 60° C. for a time sufficient (generally about 30 seconds or more) to form a forewarmed dairy liquid having a reduced level of at least about 25 percent of pH 4.6 soluble protein; (3) concentrating the forewarmed dairy liquid to form a first intermediate dairy liquid having at least 8.5 percent total protein, wherein the concentration is carried out using ultrafiltration with or without diafiltration; (4) adding a stabilizer and a mouthfeel enhancer to the first intermediate dairy liquid to form a second intermediate dairy liquid; and (5) sterilizing the second intermediate dairy liquid at a temperature and for a time sufficient to obtain the stable concentrated dairy liquid, wherein the stable concentrated dairy liquid has a $F_o$ of at least 5, wherein the second intermediate dairy liquid is resistant to gelation during sterilization, and wherein the stable concentrated dairy liquid is resistant to gelation for at least about six months of storage under ambient conditions. Preferably the second intermediate dairy liquid is resistant to gelation and browning during sterilization and the stable concentrated dairy liquid is resistant to gelation and browning for at least about six months of storage under ambient conditions. For about 3× milk, preferably the forewarming in step (2) includes a first stage at about 80 to about 100° C. for about 2 to about 6 minutes followed by a second stage at about 100 to about 130° C. for about 1 to about 60 seconds; more preferably, the first stage is at about 80 to about 90° C. for about 3 to about 4 minutes and the second stage is at about 105 to about 115° C. for about 15 to about 45 seconds. For about 5× milk, preferably the forewarming in step (2) is at about 70 to about 100° C. for about 1.5 to about 6 minutes. These ranges may, of course, be varied so long as the desired reduction of pH 4.6 soluble protein (generally at least about 25 percent reduction, preferably about 50 to about 95 percent reduction, and more preferably about 70 to about 90 percent reduction) and the desired stability of the final product is achieved. In one embodiment, the sterilization is carried out by (a) heating the second intermediate dairy liquid to a temperature of about 118 to about 145° C. within about 1 second to about 30 minutes and (b) maintaining the heated second intermediate dairy liquid at a temperature of about 118 to about 145° C. for about 1.5 seconds to about 15 minutes. If desired, the concentrated dairy liquid can be homogenized prior to packaging. If desired, the second intermediate dairy liquid can be standardized prior to the sterilization step. Such a standardization step would allow less exacting control over the ultrafiltration (with or without diafiltration) step since standardization of the second intermediate dairy liquid could correct for variations in the concentration level of the first intermediate dairy liquid from the ultrafiltration step. Using ultrafiltration with or without diafiltration to prepare a 3× to 5× concentrate will generally result in a total solids content of about 12 to about 40 percent. With such concentration methods, a significant amount of the lactose and minerals are removed during the concentration step. The concentrated dairy liquids of this invention contain at least about 8.5 percent protein.

The present invention also provides a stable concentrated dairy liquid comprising about 9 to about 15 percent total protein, about 0.3 to about 17 percent fat, about 0.5 to about 5 percent (preferably about 0.5 to about 1.5 percent) lactose, about 0.05 to about 1 percent stabilizer, and about 0.05 to about 1 percent mouthfeel enhancer; wherein the stable concentrated dairy liquid has a $F_o$ of 5 to about 12 and wherein the stable concentrated dairy liquid is resistant to gelation for at least about six months of storage under ambient conditions.

DETAILED DESCRIPTION

The invention is directed to a shelf stable and organoleptically-pleasing concentrated dairy liquid having greater than about 8.5 percent total protein (and preferably greater than about 9 percent total protein), wherein the stable concentrated dairy liquid has reduced level of soluble protein prior to concentration using ultrafiltration with or without diafiltration, wherein a stabilizer and a mouthfeel enhancer are added to the intermediate dairy liquid prior to sterilization, wherein the intermediate dairy liquid is resistant to gelation and browning during sterilization, and wherein the stable concentrated dairy liquid is resistant to gelation and browning for at least about six months of storage under ambient conditions.

The concentrated dairy liquid is obtained using thermal processing to achieve the stable concentrated dairy liquid having a sterilization value $F_o$ of at least about 5 (preferably at least about 6.5 and more preferably at least about 7.5). The present invention also includes methods to obtain such concentrated dairy liquids.

In general, the stable and organoleptically-pleasing dairy liquid is formed through a multi-step thermal process to achieve a desired sterilization value and product stability characteristics. For instance, the method comprises forewarming, concentrating using ultrafiltration with or without diafiltration, and sterilizing steps that provides an overall thermal treatment that produces the stable concentrated dairy liquid having a $F_o$ of at least about 5, preferably at least about 6.5, and more preferably at least about 7.5. Importantly, a stabilizer and a mouthfeel enhancer are added to the ultrafiltrated milk concentrate prior to sterilization.

Figure 1:
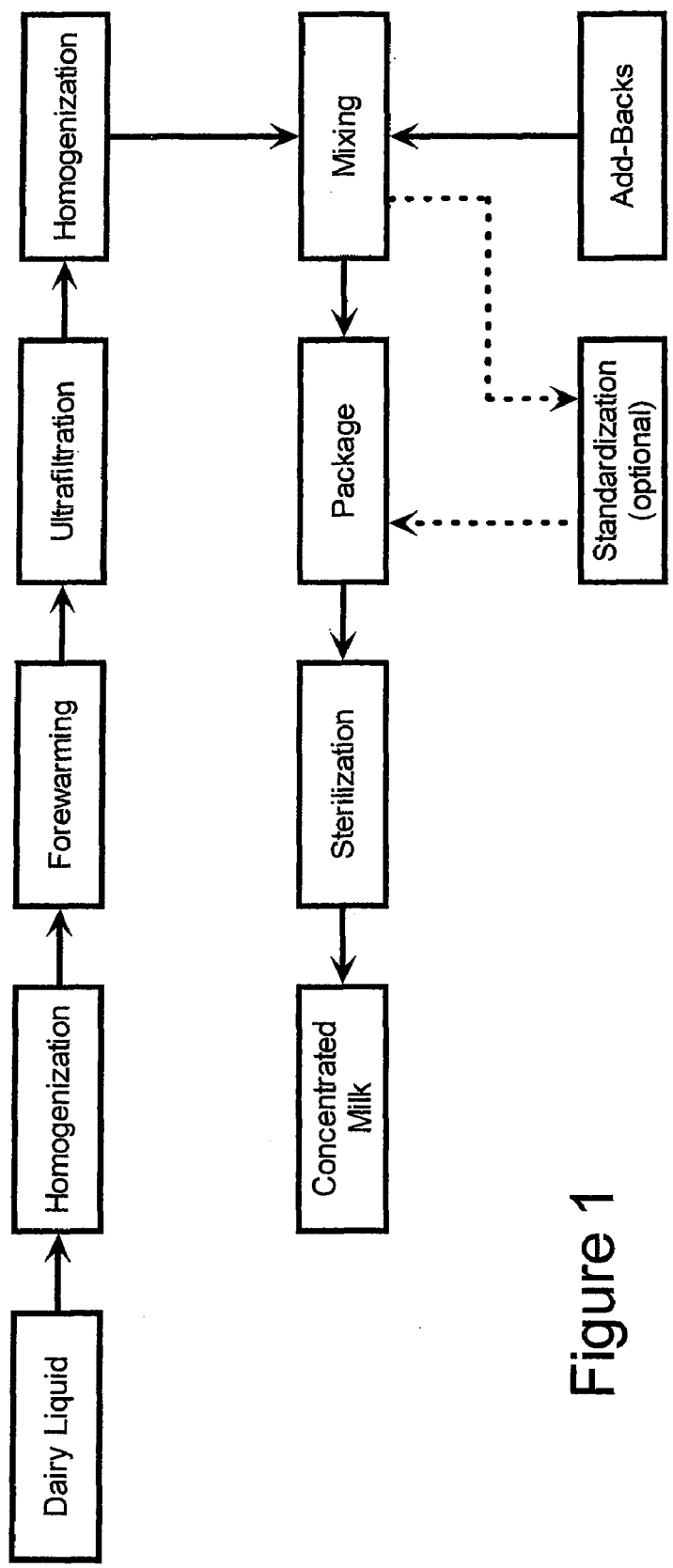
FIG. 1 provides a flowchart illustrating the general method of the present invention.

FIG. 1 illustrates the general method of the present invention. A dairy liquid is homogenized and then forewarmed to a temperature and for a time effective in reducing soluble protein by at least about 25 percent, preferably by about 50 to about 95 percent, and more preferably by about 70 to 90 percent (as measured by pH 4.6 soluble protein). The forewarmed dairy liquid is then concentrated to the desired level, generally greater than about 3× using ultrafiltration type techniques alone or combined with diafiltration techniques. If ultrafiltration is combined with diafiltration, the diafiltration should be carried out during or after ultrafiltration. After the concentration step, the concentrated dairy liquid is then homogenized. A stabilizer and a mouthfeel enhancer are then added to the homogenized concentrated dairy liquid. After these add-backs, the concentrated dairy liquid, which has greater than about 8.5 percent total protein, can be packaged and sterilized to a $F_o$ greater than 5 to provide the desired stable concentrated dairy liquid.

Figure 2:
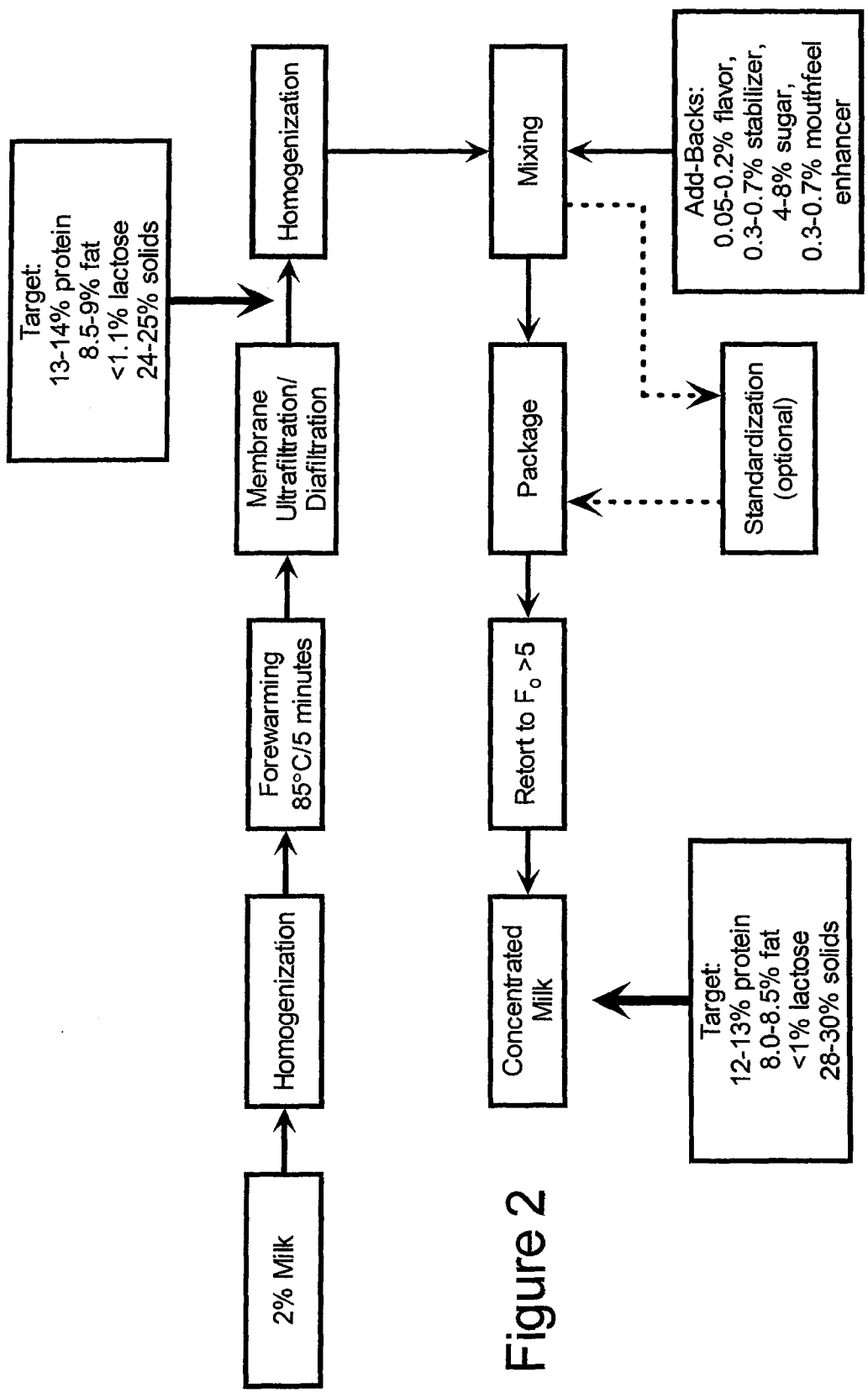
FIG. 2 provides a flowchart illustrating a preferred embodiment of the present invention.

FIG. 2 illustrates a preferred embodiment of the present invention to produce concentrated milk. Two-percent milk is homogenized and then forewarmed (e.g., at about 85° C. for about 5 minutes) to effect at least about a 25, and preferably at least a 50, percent reduction in soluble protein (measured as pH 4.6 soluble protein). The forewarmed milk is then concentrated using ultrafiltration, preferably with diafiltration, to achieve a target composition having about 13 to about 14 percent protein, about 8.5 to about 9 percent fat, less than about 1.1 percent lactose, and about 24 to about 25 percent solids. The resulting concentrated composition is then homogenized. Add-backs comprising at least one stabilizer (e.g., about 0.5 to about 1 percent trisodium citrate), at least one mouthfeel enhancer (e.g., about 0.5 to about 1 percent sodium chloride), and optional additives (e.g., about 0.01 to about 0.3 percent flavor and about 4 to about 8 percent sugar) are then mixed with the homogenized concentrated milk product. The resulting product is then packaged and sterilized (e.g., retorted) to achieve a $F_o$ of at least 5 and to provide the desired stable concentrated dairy liquid, having a target composition of about 12 to about 13 percent protein, about 8 to about 8.5 percent fat, less than about 1 percent lactose, and about 28 to about 30 percent solids.

For purposes herein, the following terms have the meanings indicated: "Serum protein" refers to the protein content of milk plasma other than casein (i.e., serum protein refers to whey protein content). "Milk plasma" is the portion of raw milk remaining after removal of the fat content. "Casein" generally encompasses casein per se (i.e., acid casein) or water soluble salts thereof, such as caseinates (e.g., calcium, sodium, or potassium caseinates, and combinations thereof). Casein amounts and percentages described herein are reported based on the total amount present of casein and caseinate (excluding the metal cation amount thereof). Casein generally relates to any, or all, of the phosphoproteins in milk, and to mixtures of any of them. An important characteristic of casein is that it forms micelles in naturally occurring milk. Many casein components have been identified, including, but not limited to, α-casein (including $α_{s1}$-casein and $α_{s2}$-casein), β-casein, γ-casein, κ-casein, and their genetic variants.

"Reduced fat" milk means about 2 percent fat milk. "Low fat" milk means about 1 percent fat milk. "Fat free milk" or "skim milk" both mean less than 0.2 percent fat milk. "Whole milk" means not less than about 3.25 percent fat milk, and can be standardized or unstandardized. "Milk butter" means the residual product remaining after milk or cream has been made into butter and contains not less than 3.25 percent fat. "Raw milk" means milk that has not yet been thermally processed. The milk or milk products used in the processes of the present invention can be standardized or non-standardized. The preferred milk is obtained from cows; other mammalian milk suitable for human consumption can be used if desired.

"Shelf-life" means the period of time at which a dairy product can be stored at 70° F. without developing an objectionable organoleptic characteristic, such as an objectionable aroma, appearance, taste, consistency, or mouthfeel. In addition, an organoleptically acceptable dairy product at a given shelf life will have no off-odor, off-flavor, or brown coloring, will not have a clumped, ropy, or slippery texture, and will remain ungelled. "Stable" or "shelf-stable" means that the dairy product at a given time does not have objectionable organoleptic characteristics as defined above and is organoleptically acceptable.

"Total milk solids" or "total solids" refers to the total of the fat and solid-not-fat (SNF) contents. "SNF" refers to the total weight of the protein, lactose, minerals, acids, enzymes, and vitamins.

Essentially any dairy liquid can be used in the present method. Preferably, the dairy liquid originates from any lactating livestock animal whose milk is useful as a source of human food. Such livestock animals include, by way of non-limiting example, cows, buffalos, other ruminates, goats, sheep, and the like. Generally, however, cow's milk is preferred as the starting material. The milk used may be whole milk, low-fat milk, or skim milk.

Cow's milk contains lactose, fat, protein, minerals, and water, as well as smaller amounts of acids, enzymes, gases, and vitamins. Although many factors may affect the composition of raw cow's milk, it generally contains about 11 to about 15 percent total solids, about 2 to about 6 percent milk fat, about 3 to about 4 percent protein, about 4 to about 5 percent lactose, about 0.5 to about 1 percent minerals, and about 85 to about 89 percent water. Although milk contains many types of proteins, they generally can be grouped into the two general categories: casein proteins and serum proteins. The minerals, also known as milk salts or ash, generally include, as the major components, calcium, sodium, potassium, and magnesium; these cations can combine with phosphates, chlorides, and citrates in milk. Milk fat is mostly comprised of triglycerides, and smaller amounts of various other lipids. Lactose or milk sugar (4-O-β-D-galactopyranosyl-D-glucose) is a reducible disaccharide present in raw milk.

The dairy liquid is initially forewarmed or preheated. Forewarming can be accomplished using any method or equipment known in the art (e.g. jacketed reactors, heat exchangers, and the like). Not wishing to be limited by theory, it is believed that forewarming initially crosslinks the serum or whey proteins to the casein micelles present in the milk; most crosslinking is likely to occur to the outer surfaces of the micelles. Such crosslinking will reduce the amount of soluble protein. Again, not wishing to be limited by theory, forewarming may also allow the whey proteins to interact covalently and/or hydrophobically with the micelles and especially with the outer surfaces of the micelles. Again, not wishing to be limited by theory, it is further believed that these interactions accomplish at least two effects. First, the interaction removes many of the whey proteins from solution; this effect may be important because the whey proteins are very reactive at high temperatures, such as those experienced in sterilization. Secondly, as the casein micelles become coated with serum or whey proteins, casein-casein interactions should be reduced and/or minimized; this effect should reduce the tendency of thermally-induced milk gels to form.

As noted, crosslinking during forewarming decreases the amount of soluble protein. The amount of soluble protein can be determined by acid precipitation followed by liquid chromatography coupled with UV detector (LC-UV). Comparison is made between forewarmed or heat processed samples and non-heat treated samples to quantify soluble protein fractions. The reduction in pH 4.6 soluble protein should be at least about 20 percent, preferably about 50 to 95 percent, and more preferably about 70 to about 90 percent. More details regarding this method of determining soluble protein are provided below in the Examples section.

The time and temperature of the forewarming step should be sufficient to obtain the desired reduction of pH 4.6 soluble protein while maintaining the desired stability of the liquid milk product during sterilization and subsequent storage. Of course, other parameters, in addition to the forewarming conditions, will effect stability during sterilization and subsequent storage and balancing of these conditions can be determined by routine experimentation using the guidance provided herein. The forewarming or preheating of the dairy liquid is generally carried out at least about 70° C. for at least about 30 seconds to form a preheated dairy liquid having a reduced level of pH 4.6 soluble protein. Preferably, forewarming is conducted at about 70 to about 100° C. for about 0.5 to about 20 minutes. More preferably, forewarming is conducted at about 85 to about 95° C. for about 2 to about 6 minutes. Other forewarming conditions may also be used so long as the desired degree of crosslinking, generally as measured by a reduction of at least about 20 percent of pH 4.6 soluble protein (preferably a reduction of about 50 to about 95 percent and more preferably about 70 to 90 percent) and the desired stability of the final product is obtained. Of course, other forewarming conditions can be used so long as the desired stability is obtained. For example, a two-stage process comprising a first stage at about 80 to about 100° C. for about 2 to about 6 minutes followed by a second stage at about 100 to about 130° C. for about 1 to about 60 seconds can be used.

After forewarming, the dairy liquid is concentrated to the desired solids level. Concentration may be completed by ultrafiltration with or without diafiltration. For purposes of this invention, ultrafiltration is considered to include other membrane concentration methods such as microfiltration and nanofiltration. Examples of suitable methods involving microfiltration, ultrafiltration, and diafiltration to concentrate a dairy liquid are found in U.S. Patent Publication 20040067296 (Apr. 8, 2004), which is incorporated herein by reference. It is preferred to concentrate the forewarmed dairy liquid by at least about 2.7 fold (and preferably by at least about 3 fold, and more preferably by at least about 4 fold) to form a concentrated dairy liquid having greater than about 8.5 percent protein (and preferably greater than about 9 percent).

The solid content of the concentrated dairy liquid will depend, at least in part, on the degree of concentration obtained in the first intermediate dairy liquid. Using ultrafiltration, a significant amount (generally at least about 40 percent and more preferably at least about 95 percent) of the lactose and minerals are removed during the concentration step. The concentrated dairy liquids of this invention contain at least about 8.5 percent protein. After concentration, the dairy liquid may optionally be chilled to about ambient temperatures or preferably refrigerated temperatures.

After concentration and optional chilling, effective amounts of a stabilizer and a flavor/mouthfeel enhancer are added to the dairy liquid. The stabilizer may be a chaotropic agent, a calcium-binding buffer, or other stabilizer which effectively binds calcium to prevent gelation or separation of the concentrated dairy liquid during storage. While not wishing to be limited by theory and as is detailed in U.S. Patent Publication 20040067296 (Apr. 8, 2004), it is believed that the calcium-binding stabilizer prevents gelation or separation of the dairy liquid during any storage prior to the subsequent sterilization. Any buffer or chaotropic agent or stabilizer which binds calcium may be used. Examples of calcium-binding buffers, stabilizers, and chaotropic agents include citrate and phosphate buffers, such as disodium phosphate, dipotassium phosphate, disodium citrate, trisodium citrate, EDTA, and the like as well as mixtures thereof. Examples of chaotropic agents include dodecyl sodium sulfate (SDS) and urea. A preferred calcium-binding buffer or stabilizer is a citrate buffer, such as trisodium citrate. Suitable mouthfeel enhancers include sodium chloride, potassium chloride, sodium sulfate, and mixtures thereof. Preferred mouthfeel enhancers include sodium chloride and potassium chloride as well as mixtures thereof; sodium chloride is the most preferred mouthfeel enhancer. Flavors and other additives such as sugar, sweeteners (natural and/or artificial), emulsifiers, fat mimetics, maltodextrin, fibers, starches, gums, and enzyme-treated, cultured, natural, and artificial flavors or flavor extracts can be added so long as they do not significantly and adversely effect either the stability or mouthfeel characteristics. Lactose can also be added if desired; increased lactose may, however, increase the potential of the concentrated milk product to brown either during sterilization or storage and thus should typically be used only where such browning does not present a significant problem (e.g., for use in dark colored beverages and the like). If additional lactose is not added, the lactose levels of the stable concentrated milk product are generally less than about 1 percent. Lactose can, if desired, be added up to about 5 percent (but preferably up to only about 1.5 percent); browning, as noted, may increase with increasing lactose levels. Preferably, such flavors, especially sugars and/or sweeteners, are added to the concentrated milk products of this invention. The effective amount of the stabilizer and mouthfeel enhancer depends on the specific dairy liquid used as the starting material, the concentration desired, and the calcium binding capacity of the specific stabilizer used. However, in general, about 0.1 to about 1 percent of trisodium citrate, about 0.1 to about 1 percent sodium chloride, about 1 to 10 percent sugar, and about 0.01 to 0.3 percent other flavors are effective in the present invention when cow's milk is the starting dairy liquid.

Figure 3:
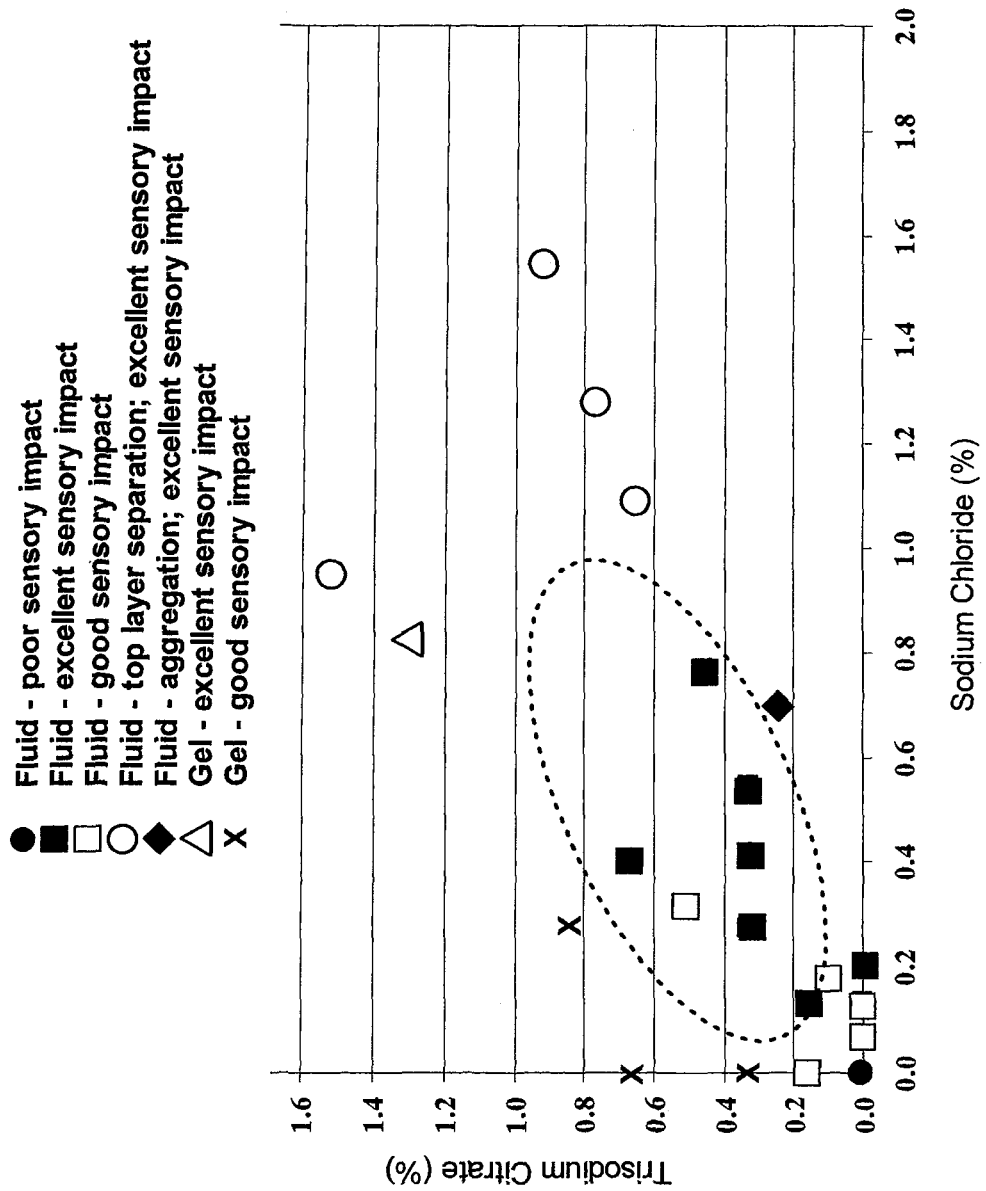
FIG. 3 provides a plot illustrating stability and mouthfeel of the concentrated dairy liquids as provided by the present invention as a function of the concentrations of stabilizer (i.e., trisodium citrate) and mouthfeel enhancer (i.e., sodium chloride). The methods used to prepare these concentrated dairy liquids are as essentially as described in Example 1 except that the concentrations of stabilizer and mouthfeel enhancer were varied.

FIG. 3 provides an illustrative plot of stability and sensory aspects as a function of the concentrations of stabilizer (i.e., trisodium citrate) and mouthfeel enhancer (i.e., sodium chloride). The space within the oval represents the best combination of stability and sensory properties; these samples remain fluid during processing and upon storage and have good to excellent mouthfeel. Based on this chart, preferred ranges for both trisodium citrate and sodium chloride are about 0.1 to about 1 percent within the limits of the data generated. Of course, as one skilled in the art would realize, the oval could extend into the upper right hand side of the chart if further data was generated; at some point, however, the product may become too salty to be satisfactory (generally expected at sodium chloride levels of greater than about 1.1 to about 1.2 percent). As one skilled in the art would also realize, the "best combination" space may move or vary depending on the specific combination of stabilizer(s) and/or mouthfeel enhancer(s) used, as well as depending on other variables associated with the process (e.g., forewarming conditions, ultrafiltration conditions, sterilization conditions, and the like). For a particular set of components and processing conditions, one of ordinary skill could produce a similar graph to guide control and optimization of the process and product.

After concentration and optional chilling, the dairy liquid is then mixed with the stabilizer and flavor/mouthfeel enhancer (and optional flavors or other additives if desired) and sterilized to form the stable, sterile, concentrated dairy liquid. Preferably, sterilization is carried out using retorting conditions. Optionally, if the concentrated dairy liquid needs to be diluted to meet a targeted concentration, the dilution should be accomplished prior to sterilization. Preferably, the dairy liquid is packaged, sealed, and then subjected to sterilization temperatures in any suitable equipment. Sterilization is carried out under time and temperature conditions to achieve a $F_o$ of at least 5. Generally, the sterilization process consists of a come-up or heating time, a holding time, and a cool-down time. During the come-up time, a temperature of about 118 to about 145° C. is achieved in about 1 second to about 30 minutes. The temperature is then maintained at about 118 to about 145° C. for about 1.5 seconds to about 15 minutes. The temperature is then cooled below about 25° C. within about 10 minutes or less. Preferably the sample is gently agitated (e.g., rotating the container) during sterilization to minimize "skin" formation.

The overall thermal treatment (i.e., forewarming, concentration, and sterilization) is controlled to produce a stable concentrated dairy liquid having a total protein content greater than about 8.5 percent and preferably greater than about 9 percent while providing a $F_o$ of at least about 5 and a shelf life of at least about six months under ambient conditions. Generally, the stable concentrated dairy liquid of the present invention has a viscosity of about 70 to about 4000 mPa and preferably about 100 to about 300 mPa at ambient temperatures. As noted, the overall thermal treatment achieves a sterilization value $F_o$ of at least 5, and achieves product characteristics that render the concentrated dairy liquid resistant to gelation and browning during the high temperature processing and also for greater than six months of ambient storage.

As noted, the concentration step is carried out using ultrafiltration, preferably with diafiltration, using a membrane pore size large enough to permit a portion of the lactose and minerals to pass through the pores with water as the permeate, while the retentate includes essentially all the protein and fat content.

For example, milk can be subjected to a membrane separation treatment to separate a protein-enriched "retentate" from a lactose-enriched permeate. The type of milk processed according to this invention is not particularly limited, and includes, for example, whole milk, skim milk, reduced fat milk, low fat milk, butter milk, and combinations thereof.

In one embodiment, membrane filtration procedure parameters used include a molecular weight (MW) cut off of approximately 10,000 using a porous polysulfone membrane, about 35 to about 65 psig applied pressure, and a processing temperature of about 110 to about 140° F. (about 43 to about 60° C.). In one embodiment, lactose and minerals pass the membrane in an about 50 percent separation ratio, and the retentate comprises about 100 percent of the fat and protein introduced by combined feed stream, about 50 percent of lactose, and about 50 percent of free minerals relative to the feed stream. Diafiltration serves to keep the lactose concentration in the retentate below 4 percent.

As noted above, the concentrated dairy liquid can be homogenized prior to packaging. In general, homogenization may be carried out at any time after the desired dairy composition is prepared and before packaging to help break up and disperse milk fat content, if any, throughout the dairy product to better ensure a smooth, uniform texture. Homogenization, if used, may be performed in one or multiple stages. For instance, in one non-limiting embodiment a first homogenization stage can be performed at about 1,500 psi and a second stage at about 500 psi in an industry standard homogenizer. The homogenate may be cooled if it will not be immediately conducted to a packaging operation. For example, the homogenate may be cooled as it flows through a regeneration and cooling section of a plate heat exchanger of a standard homogenizer. Other homogenization schemes applicable to milk products also may be used.

The packaging technique used is not particularly limited as long as it preserves the integrity of the dairy product sufficient for the applicable shelf life of the dairy product. For example, milk concentrates can be sterilized or retorted in glass bottles or gable-top cartons, and so forth, which are filled, sealed, and the contents are then thermally processed. The dairy products also can be packaged in larger quantities such as in conventional bag-in-box containers or totes. In one embodiment, presterilized bottles or foil-lined gable-top carton materials may be used. Food packaging systems designated as extended shelf life (ESL) or aseptic packaging systems may also be used, but the invention is not limited thereto. The useful food packaging systems include conventional systems applied or applicable to flowable food products, especially milk products and fruit juices. As noted above, preferably the samples are gently agitated (e.g., rotating the container) during sterilization to minimize "skin" formation. The dairy product also may be loaded into and transported in bulk form via tanker trucks or rail car tankers.

Although not required to achieve the extended shelf lives associated with dairy products of the present invention, pasteurization and/or ultra-high temperature (UHT) procedures also may be applied to dairy products of the present invention in the event of process interruption and/or for further shelf life enhancement. UHT products are ultrapasteurized and then packaged in sterilized containers. Moreover, one advantage of the present invention is that UHT processing is not required to obtain extended shelf lives. For example, if the ultrafiltered/diafiltered product is to be held for an extended period of time (e.g., greater than about a day) before continuing the process, pasteurization of the ultrafiltered product may be undertaken. If desired, intermediate products in the process may be pasteurized if desired so long as the pasteurization does adversely effect stability or mouthfeel of the final product.

The stable concentrated dairy liquid, in a preferred form, is an organoleptically pleasing milk that may be sealed in cartridges or pods to be used in any number of beverage preparation machines. Examples of preferred uses and beverage preparation machines can be found in U.S. patent application Ser. No. 10/763,680, filed Jan. 23, 2004, now U.S. Pat. No. 7,640,843 issued on Jan. 5, 2010, and owned by the same assignee as the present specification. This just-identified patent application is incorporated herein by reference. The concentration of the milk is beneficial because it allows for larger volumes of the milk to be dispensed from the beverage preparation machines while being able to store a smaller package with less quantity of liquid.

For instance, a cartridge of the concentrated milk may be used to produce an authentic looking frothy milk-based foam desired by consumers in a cappuccino-style beverage. The cartridge of the stable concentrated milk is also suitable for foaming using a low pressure preparation machine and cartridge as described in U.S. patent application Ser. No. 10/763,680 using only pressures below about 2 bar.

In addition, a milk beverage may also be formed using the stable concentrated milk. For example, a beverage may be formed by mixing the stable concentrated milk with an aqueous medium. The milk beverage may also be dispensed from a cartridge containing the stable concentrated milk, also described in U.S. patent application Ser. No. 10/763,680, by passing an aqueous medium through the cartridge to form a beverage by dilution. The concentrated milk may preferably be mixed or diluted with the aqueous medium in a ratio of between about 1:1 to about 6:1.

The following examples are intended to illustrate the invention and not to limit it. Unless otherwise indicated, all percentages are by weight. All references, including provisional applications, patent publications, patents, and other references or publications, cited in the present specification are hereby incorporated by reference.

EXAMPLES

Analytical Method for pH 4.6 Soluble Protein: The analysis of pH 4.6 soluble proteins is specific for the quantization of a-lactalbumin and 13-lactoglobulin serum proteins. A summary of the sample preparation and analysis is described below. The method is based on methodologies published in J. Agric. Food Chem. 1996, 44, 3955-3959 and Int. J. Food Sci. Tech. 2000, 35, 193-200 with modifications to make it amendable to HPLC-mass spectrometry.

The sample preparation starts with weighing out 50.00±0.02 g of material in a 100 mL beaker. A stir bar was placed in the beaker and stirred vigorously for 5 minutes to obtain a stable pH reading. Next, the pH was lowered to 4.6 (22±2° C.) by the drop wise addition of HCl. Once the pH reading was stable for ca. 5 minutes, a portion was poured into a disposable polypropylene vial and centrifuged (15 minutes at 4° C. and 2600×g). A portion of the supernatant below the fat layer, but above the protein pellet, was removed with a disposable pipette.

Appropriate dilutions were made with 0.1 M (pH 6.7) phosphate buffer (Sigma, St. Louis, Mo., USA) to fit the calibration range of standards. Portions of the diluted samples were placed in micro-spin filter tubes composed of a 0.45 μm regenerated cellulose membrane and centrifuged (1 minute at room temperature and 2000×g).

Samples were analyzed by reversed-phase HPLC using two PLRP-S 5 mm, 300A, 150×2.1 mm columns in series (Polymer Laboratories Inc., Amherst, Mass.). The mobile phase was a linear binary gradient from 64:36 to 47:53 water: acetonitrile both containing 5% formic acid in 15 minutes. The flow-rate was 225 μL/min with an injection volume of 15 μL. The UV absorption at 280 nm was recorded for quantitation. All isoforms of αα-lactalbumin and β-lactoglobulin, which were chromatographically resolved, were summed together as a group, respectively.

Analytical Method for Total Protein: The total protein after the concentrating step was measured by using the AOAC Official Method 991.20 Nitrogen (Total) in Milk.

Example 1

This Example illustrates the preparation of 4.5× milk using the process of this invention. Three concentrated milk products were prepared according to the formulas described in Table 1. Inventive Samples 1 and 2 represent examples of the present invention and are compared to a comparison sample.

All inventive products and the comparison product were prepared using the same batch of concentrated 2% milk. The reduced fat milk was forewarmed by heating to 88° C. for about 5 minutes (pH soluble protein reduced by greater than about 50 percent) and then concentrated to provide a 4.5× concentrate product using ultrafiltration with diafiltration. The membrane filtration was conducted at 120° F. and 40-60 psig. The membrane filtration system used was a polysulfone membrane pore sized to provide about a 10,000 MW cutoff. The fresh 2% milk was produced with 200 lbs being concentrated to 4.5× in 5 hours with about 80 pounds diafiltration water added during this time.

After ultrafiltration with diafiltration, the concentrated milk was homogenized at 1,500 psi and cooled at 45° F., mixed with various amounts of salts and sugar and stored until packaged and retorted. Stabilizers and mouthfeel enhancers were added to Inventive Samples 1 and 2 as indicated in Table 1 before packaging and retorting. The comparison milk product represented a milk concentrate without added stabilizer or mouthfeel enhancer. All samples were packaged in 350 mL glass bottles or gable-top cartons, and retorted under the temperature and time conditions indicated in Table 1. All three samples had more than about 10 percent protein.

TABLE 1

| Formula | Comparative Sample | Inventive Sample 1 | Inventive Sample 2 |
|---|---|---|---|
| 4.5X UF/DF 2% milk concentrate | 100 | 93.1 | 90.5 |
| Flavor (%) | 0 | 0.02 | 0.02 |
| Trisodium Citrate (%) | 0 | 0.3 | 0.7 |
| Salt (%) | 0 | 0.6 | 0.4 |
| Sucrose (%) | 0 | 6.0 | 8.5 |
| Total (%) | 100 | 100 | 100 |
| Retort Conditions (time/temp/package*) | 8 min/ 253° F./GB | 8 min/253° F./ GB | 8 min/253° F./GB |
| Product Quality** (0 Time) | 1 | 2 | 2 |
| Product Quality** (3 months at 70° F.) | 1 | 2 | 2 |

*"GB" - glass bottle was used as the packaging container; "GC" - gable-top carton was used.
**Mouthfeel measurements were at 60° C. using samples diluted back to 1X milk. Organoleptic product quality score: 1 = watery, thin mouthfeel, bland taste; 2 = milky, 2% milk-like consistency and color, and pleasant dairy flavor.

The 4.5× UF/DF 2% milk composition including 24.5% total solids, 13.6% protein, 8.8% fat, 0.9% lactose, and 1.2% ash. Stabilizers and mouthfeel enhancers (i.e., 0.33% trisodium citrate, 0.55% sodium chloride, 6% sucrose, and 0.02% flavor concentrate for Inventive Sample 1; 0.66% trisodium citrate, 0.275% sodium chloride, 8.5% sucrose, and 0.02% flavor concentrate for Inventive Sample 2) were added prior to retorting under the conditions presented in Table 1.

Organoleptic evaluations of the various dairy products were performed on freshly packaged, retorted products and after storage at 70° F. for one month or three months. Inventive Samples 1 and 2 were white, flowable with about an olive-oil consistency, and exhibited no signs of browning or gelling immediately after being prepared or after storage for up to eight months. The reconstituted dairy products from Inventive Samples 1 and 2 (diluted to 1× concentration and evaluated after 3 months storage) had a very good dairy flavor and pleasant mouthfeel similar to that of 2% milk. In contrast, the Comparative Sample had watery-like mouthfeel and bland taste with little dairy flavor.

Similar results were obtained using other types of milk (i.e., skim milk, reduced fat milk, and whole milk, as well as combinations thereof). Similar concentrated milk samples prepared by the method described herein have been found to be stable (i.e., no gelation) for up to about 8 months (i.e., as of the filing date of this specification) at ambient temperatures; stability testing is ongoing as of the filing date of this specification.

Example 2

Experiments similar to Example 1 were carried out using different levels of the stabilizers and mouthfeel enhancers. All inventive products and the comparison product were prepared using the same batch of concentrated 2% milk and the same techniques as described in Example 1 (i.e., reduced fat milk was forewarmed by heating to 88° C. for about 5 minutes and then concentrated to provide a 4.5× concentrate product using ultrafiltration/diafiltration). The pH 4.6 soluble protein was reduced by about 70 percent during the forewarming step.

Stabilizers and mouthfeel enhancers were added to Inventive Samples 2 to 7 in Table 2 before packaging and retorting. The comparison milk product 1 represented a milk concentrate without added stabilizer or mouthfeel enhancer. All samples were packaged in 350 mL glass bottles and retorted under the temperature and time conditions as described in Example 1. All samples had more than about 10 percent protein.

Organoleptic evaluations of the various dairy products were performed on freshly packaged, retorted products and after storage at 70° F. for 1 week. Evaluations were conducted by a panel of seven trained food technologists. Mouthfeel ratings fell into three categories: low (i.e., unacceptable), medium (i.e., good), and high (i.e., excellent); the low ranking was comparable to a ranking of 1 in Examples 1 and 2, whereas medium and high are comparable to a ranking of 2. High rating indicates that the milk had a full mouthfeel similar to that of 2% milk. In contrast, low rating indicates that milk had watery-like mouthfeel. Inventive Samples 2 to 7 remained fluid without browning or gelling immediately after being prepared or after storage for at least 1 month.

TABLE 2

| Formula | Comparative Sample 1 | Inventive Samples | | | | | |
|---|---|---|---|---|---|---|---|
| | | 2 | 3 | 4 | 5 | 6 | 7 |
| 4.5X UF/DF 2% milk concentrate | 100 | 91.5 | 91.9 | 93.7 | 92.7 | 91.5 | 93.2 |
| Flavor (%) | 0 | 0.02 | 0.02 | 0.02 | 0.02 | 0.02 | 0.02 |
| Trisodium citrate (%) | 0 | 0.9 | 0.8 | 0.1 | 0.5 | 1.5 | 0.5 |
| NaCl (%) | 0 | 1.5 | 1.3 | 0.2 | 0.8 | 1.0 | 0.3 |
| Sucrose (%) | 0 | 6 | 6 | 6 | 6 | 6 | 6 |
| Total (%) | 100 | 100 | 100 | 100 | 100 | 100 | 100 |
| Product Quality* (1 week) | Low | High | High | Medium | High | High | Medium |

*Mouthfeel measurements were at 60° C. using samples diluted back to 1X milk. Organoleptic product quality score: Low = watery, thin mouthfeel, bland taste; Medium = increased mouthfeel and dairy notes but less mouthfeel than 2% milk; High = milky, 2% milk-like consistency, color, and mouthfeel with pleasant dairy flavor.

Example 3

Additional experiments similar to Example 2 were also carried out using different stabilizer and/or mouthfeel enhancers. All inventive products and the comparison product were prepared using the same batch of concentrated 2% milk and the same techniques as described in Example 1 (i.e., reduced fat milk was forewarmed by heating to 88° C. for about 5 minutes and then concentrated to provide a 4.5× concentrate product using ultrafiltration/diafiltration). The pH 4.6 soluble protein was reduced by about 70 percent during the forewarming step.

Stabilizers and mouthfeel enhancers were added to Inventive Samples 2 to 7 in Table 3 before packaging and retorting. The comparison milk product 1 represented a milk concentrate without added stabilizer or mouthfeel enhancer. All samples were packaged in 350 mL glass bottles and retorted under the temperature and time conditions as described in Example 1. All samples had more than about 10 percent protein.

Organoleptic evaluations of the various dairy products were performed on freshly packaged, retorted products and after storage at 70° F. for 1 week. Evaluations were conducted by the same panel using the same ranking categories as in Example 2. Inventive Samples 2 to 7 remained fluid without browning or gelling immediately after being prepared or after storage for at least 1 month.

TABLE 3

| Formula | Comparative Sample 1 | Inventive Samples | | | | | |
|---|---|---|---|---|---|---|---|
| | | 2 | 3 | 4 | 5 | 6 | 7 |
| 4.5X UF/DF 2% milk concentrate | 100 | 93.0 | 93.0 | 93.1 | 93.1 | 93.1 | 93.0 |
| Flavor (%) | 0 | 0.02 | 0.02 | 0.02 | 0.02 | 0.02 | 0.02 |
| Trisodium citrate (%) | 0 | 0.3 | 0.3 | 0 | 0 | 0 | 0.3 |
| Tripotassium citrate (%) | 0 | 0 | 0 | 0.4 | 0 | 0 | 0 |
| Disodium phosphate (%) | 0 | 0 | 0 | 0 | 0.3 | 0 | 0 |
| Sodium Hexametaphosphate (%) | 0 | 0 | 0 | 0 | 0 | 0.3 | 0 |
| NaCl (%) | 0 | 0 | 0.3 | 0.6 | 0.6 | 0.6 | 0 |
| KCl (%) | 0 | 0.7 | 0.4 | 0 | 0 | 0 | 0 |
| $Na_2SO_4$ (%) | 0 | 0 | 0 | 0 | 0 | 0 | 0.7 |
| Sucrose (%) | 0 | 6 | 6 | 6 | 6 | 6 | 6 |
| Total (%) | 100 | 100 | 100 | 100 | 100 | 100 | 100 |
| Product Quality* (1 week) | Low | High | High | High | High | High | Medium |

*Mouthfeel measurements were at 60° C. using samples diluted back to 1X milk. Organoleptic product quality score: Low = watery, thin mouthfeel, bland taste; Medium = increased mouthfeel and dairy notes but less mouthfeel than 2% milk; High = milky, 2% milk-like consistency, color, and mouthfeel with pleasant dairy flavor.

The stabilizers (i.e., trisodium citrate, tripotassium citrate, disodium phosphate, and sodium hexametaphosphate) produced superior milk concentrates when used in combination with NaCl and/or KCl as the mouthfeel enhancer. Sodium sulfate, when used as the mouthfeel enhancer, produced an acceptable, but not superior, concentrated milk product.

Example 4

This Example compares the use of ultrafiltration with and without diafiltration. The reduced fat (2%) milk was forewarmed by heating to 88° C. for about 5 minutes and then concentrated to provide a 4.5× concentrate product using ultrafiltration only, or with 1× equal volume diafiltration (abbreviated as 1× DF) or 1× equal volume diafiltration followed by another 1× equal volume diafiltration (abbreviated as 2× DF). Diafiltration, when used, was carried out after ultrafiltration. Otherwise, the methods used were as described in Example 1. The pH 4.6 acid soluble protein was reduced by 78% using the forewarming step. Table 4 lists sample formulation and sensory evaluation.

Comparative Samples 1-3 were concentrated milk without any add backs. Inventive Samples 4-6 contained the stabilizing salt and mouthfeel enhancer, which were added before packaging and retorting. All samples were packaged in 350 mL glass bottles and retorted under the temperature and time conditions as described in Example 1. All samples had more than about 10 percent protein.

Organoleptic evaluations of the various dairy products were performed on freshly packaged, retorted products and after storage at 70° F. within 1 week using the same methods as described in Example 1.

TABLE 4

| Formula | Comparative Samples | | | Inventive Samples | | |
|---|---|---|---|---|---|---|
| | 1 | 2 | 3 | 4 | 5 | 6 |
| 4.5X UF, no DF | 100 | 0 | 0 | 93.1 | 0 | 0 |
| 4.5X UF, 1X DF | 0 | 100 | 0 | 0 | 93.1 | 0 |
| 4.5X UF, 2X DF | 0 | 0 | 100 | 0 | 0 | 93.1 |
| Flavor (%) | 0 | 0 | 0 | 0.02 | 0.02 | 0.02 |
| Trisodium citrate (%) | 0 | 0 | 0 | 0.3 | 0.3 | 0.3 |
| NaCl (%) | 0 | 0 | 0 | 0.6 | 0.6 | 0.6 |
| Sucrose (%) | 0 | 0 | 0 | 6 | 6 | 6 |
| Total (%) | 100 | 100 | 100 | 100 | 100 | 100 |
| Product Quality* (1 week) | Low | Low | Low | High | High | High |

*Mouthfeel measurements were at 60° C. using samples diluted back to 1X milk. Organoleptic product quality score: Low = watery, thin mouthfeel, bland taste; Medium = increased mouthfeel and dairy notes but less mouthfeel than 2% milk; High = milky, 2% milk-like consistency, color, and mouthfeel with pleasant dairy flavor.

Inventive Samples 4 to 6 were fluid without browning or gelling immediately after being prepared or after storage for at least 1 month and had excellent mouthfeel. Comparative Examples 1 to 3, although they did not gel, had unacceptable mouthfeel properties.

Example 5

This Example compares the addition of the stabilizer and mouthfeel enhancer alone or in combination. The procedures used were as described in Example 1 (i.e., forewarming at 88° C. for about 5 minutes and then concentrated to 4.5× using ultrafiltration and diafiltration). The pH 4.6 soluble protein was reduced by 74 percent after the forewarming step. Table 5 lists sample formulation and sensory evaluation. All samples were packaged in 350 mL glass bottles and retorted under the temperature and time conditions as described in Example 1. All samples had more than about 10 percent protein.

Organoleptic evaluations were carried out on freshly packaged, retorted products and after storage at 70° F. for one week using the same procedures as in Example 1. Inventive Samples 4-7 were fluid without browning or gelling immediately after being prepared or after storage for at least 1 month.

TABLE 5

| Formula | Comparative Samples | | | Inventive Sample |
|---|---|---|---|---|
| | 1 | 2 | 3 | |
| 4.5X UF, 2X DF | 100 | 93.7 | 93.4 | 93.1 |
| Flavor (%) | 0 | 0.02 | 0.02 | 0.02 |
| Trisodium citrate (%) | 0 | 0.33 | 0 | 0.33 |
| NaCl (%) | 0 | 0 | 0.6 | 0.55 |
| Sucrose (%) | 0 | 6 | 6 | 6 |
| Total (%) | 100 | 100 | 100 | 100 |
| Product Quality* (1 week) | Low | Gelled | Gelled | High |

*Mouthfeel measurements were at 60° C. using samples diluted back to 1X milk. Organoleptic product quality score: Low = watery, thin mouthfeel, bland taste; Medium = increased mouthfeel and dairy notes but less mouthfeel than 2% milk; High = milky, 2% milk-like consistency, color, and mouthfeel with pleasant dairy flavor. Gelled samples were not evaluated for mouthfeel or other organoleptic properties.

Separate addition of only the stabilizer (such as trisodium citrate) at low levels (<about 0.2 percent) or the mouthfeel enhancer (such as NaCl) at low levels (<about 0.275 percent) provided milk stability but a less than desirable level of mouthfeel. Addition of only the stabilizer at high levels (>about 0.2 percent) or the mouthfeel enhancer at (>about 0.275 percent) resulted in gelation during retorting. When both the stabilizer and mouthfeel enhancer were used, excellent milk stability and good to excellent mouthfeel were obtained.

Example 6

This Example demonstrates that monovalent cations, such as potassium and sodium, contribute to milk stability and mouthfeel whereas divalent cations provide unacceptable results (i.e., milk gelation). The procedures used were as described in Example 1. The following formulations were prepared and evaluated.

TABLE 6

| Formula | Comparative Samples | | | | | Inventive Sample |
|---|---|---|---|---|---|---|
| | 1 | 2 | 3 | 4 | 5 | |
| 4.5X UF, 2X DF | 100 | 93.9 | 93.8 | 93.7 | 93.1 | 93.1 |
| Flavor (%) | 0 | 0.02 | 0.02 | 0.02 | 0.02 | 0.02 |
| Trisodium citrate (%) | 0 | 0.33 | 0.33 | 0.33 | 0.33 | 0.33 |
| NaCl (%) | 0 | 0 | 0 | 0 | 0 | 0.55 |
| $MgCl_2 \cdot 6H_2O$ (%) | 0 | 0.96 | 0.64 | 0 | 0 | 0 |
| $CaCl_2$ (%) | 0 | 0 | 0 | 0.52 | 0.35 | 0 |
| Sucrose (%) | 0 | 6 | 6 | 6 | 6 | 6 |
| Total (%) | 100 | 100 | 100 | 100 | 100 | 100 |
| Product Quality* (1 week) | Low | Gelled | Gelled | Gelled | Gelled | High |

*Mouthfeel measurements were at 60° C. using samples diluted back to 1X milk Organoleptic product quality score: Low = watery, thin mouthfeel, bland taste; Medium = increased mouthfeel and dairy notes but less mouthfeel than 2% milk; High = milky, 2% milk-like consistency, color, and mouthfeel with pleasant dairy flavor. Gelled samples were not evaluated for mouthfeel or other organoleptic properties.

The attempted use of divalent cation salts resulted in gelation after retorting. Only the Inventive Sample (containing trisodium citrate and sodium chloride) provided an acceptable product.

While the invention has been particularly described with specific reference to particular process and product embodiments, it will be appreciated that various alterations, modifications and adaptations may be based on the present disclosure, and are intended to be within the spirit and scope of the present invention as defined by the following claims. For instance, while the present invention has been exemplified with respect to bovine milk and milk products, it will be appreciated that the invention is generally applicable to any mammalian milk or milk product derived from mammalian milk.

What is claimed is:

1. A stable concentrated dairy liquid comprising about 9 to about 15 percent total protein, about 0.3 to about 17 percent fat, about 0.5 to about 5 percent lactose, about 0.05 to about 1 percent stabilizer selected from a chaotropic agent, a calcium-binding buffer, or other stabilizer which binds calcium, and about 0.05 to about 1 percent mouthfeel enhancer selected from sodium chloride, potassium chloride, sodium sulfate, and mixtures thereof; wherein the stabilizer and the mouthfeel enhancer are in amounts and in a ratio which are effective to prevent gelation during sterilization, effective to prevent gelation during storage of the stable concentrated dairy liquid and effective to provide an improved mouthfeel over a similar dairy liquid without the stabilizer and mouthfeel enhancer, wherein the stable concentrated dairy liquid has a $F_o$ of 5 to about 12 and wherein the stable concentrated dairy liquid is resistant to gelation for at least about six months of storage under ambient conditions.

2. The stable concentrated dairy liquid of claim 1, wherein the lactose is about 0.5 to about 1.5 percent.

3. The stable concentrated dairy liquid of claim 1, wherein the stable concentrated dairy liquid is obtained by a process comprising
(1) providing a dairy liquid containing serum proteins and casein proteins;
(2) concentrating the forewarmed dairy liquid to form a first intermediate dairy liquid having at least 9 percent total protein, wherein the concentration is carried out using ultrafiltration with or without diafiltration;
(3) adding the stabilizer and the mouthfeel enhancer to the first intermediate dairy liquid to form a second intermediate dairy liquid; and
(4) sterilizing the second intermediate dairy liquid at a temperature and for a time sufficient to obtain the stable concentrated dairy liquid with $F_o$ of at least 5,
wherein the second intermediate dairy liquid is resistant to gelation during sterilization.

4. The stable concentrated dairy liquid of claim 3, wherein the forewarming comprises a first stage at about 80 to about 100° C. for about 2 to about 6 minutes followed by a second stage at about 100 to about 130° C. for about 1 to about 60 seconds and wherein the reduced level of pH 4.6 soluble protein in the forewarmed dairy liquid is about 50 to about 95 percent.

5. The stable concentrated dairy liquid of claim 3, wherein the forewarming comprises heating to about 70 to about 100° C. for about 1.5 to about 6 minutes and wherein the reduced level of pH 4.6 soluble protein in the forewarmed dairy liquid is about 50 to about 95 percent.

6. The stable concentrated dairy liquid of claim 3, wherein the stabilizer is added to the first intermediate dairy liquid at about 0.1 to about 1 percent, and the stabilizer is selected from the group consisting of disodium phosphate, dipotassium phosphate, disodium citrate, trisodium citrate, and mixtures thereof; and wherein the mouthfeel enhancer is added to the first intermediate dairy liquid at about 0.1 to about 1 percent and the mouthfeel enhancer is selected from the group consisting of sodium chloride, potassium chloride, sodium sulfate, and mixtures thereof.

7. The stable concentrated dairy liquid of claim 3, wherein the stabilizer is added to the first intermediate dairy liquid at about 0.1 to about 1 percent, and the stabilizer is selected from the group consisting of disodium phosphate, dipotassium phosphate, disodium citrate, trisodium citrate, and mixtures thereof; and wherein the mouthfeel enhancer is added to the first intermediate dairy liquid at about 0.1 to about 1 percent and the mouthfeel enhancer is selected from the group consisting of sodium chloride, potassium chloride, sodium sulfate, and mixtures thereof.

8. The stable concentrated dairy liquid of claim 5, wherein the stabilizer is added to the first intermediate dairy liquid at about 0.1 to about 1 percent, and the stabilizer is selected from the group consisting of disodium phosphate, dipotassium phosphate, disodium citrate, trisodium citrate, and mixtures thereof; and wherein the mouthfeel enhancer is added to the first intermediate dairy liquid at about 0.1 to about 1 percent and the mouthfeel enhancer is selected from the group consisting of sodium chloride, potassium chloride, sodium sulfate, and mixtures thereof.

9. The stable concentrated dairy liquid of claim 6, wherein the stabilizer is disodium phosphate or trisodium citrate and the mouthfeel enhancer is sodium chloride.

10. The stable concentrated dairy liquid of claim 7, wherein the stabilizer is disodium phosphate or trisodium citrate and the mouthfeel enhancer is sodium chloride.

11. The stable concentrated dairy liquid of claim 8, wherein the stabilizer is disodium phosphate or trisodium citrate and the mouthfeel enhancer is sodium chloride.

12. The stable concentrated dairy liquid of claim 1 wherein the stable concentrated dairy liquid is packaged in a sealed container suitable for use in a beverage making machine.

13. The stable concentrated dairy liquid of claim 3, wherein the stable concentrated dairy liquid is packaged in a sealed container suitable for use in a beverage making machine.

14. The stable concentrated dairy liquid of claim 6, wherein the stable concentrated dairy liquid is packaged in a sealed container suitable for use in a beverage making machine.

15. The stable concentrated dairy liquid of claim 7, wherein the stable concentrated dairy liquid is packaged in a sealed container suitable for use in a beverage making machine.

16. The stable concentrated dairy liquid of claim 8, wherein the stable concentrated dairy liquid is packaged in a sealed container suitable for use in a beverage making machine.

17. The stable concentrated dairy liquid of claim 1, wherein the stable concentrated dairy liquid is standardized to a predetermined concentration level of about 3× to about 5×.

18. The stable concentrated dairy liquid of claim 3, wherein the second intermediate dairy liquid is standardized prior to sterilization such that the stable concentrated dairy liquid has a predetermined concentration level of about 3× to about 5×.

19. The stable concentrated dairy liquid of claim 6, wherein the second intermediate dairy liquid is standardized prior to sterilization such that the stable concentrated dairy liquid has a predetermined concentration level of about 3× to about 5×.

20. The stable concentrated dairy liquid of claim 7, wherein the second intermediate dairy liquid is standardized prior to sterilization such that the stable concentrated dairy liquid has a predetermined concentration level of about 3× to about 5×.

21. The stable concentrated dairy liquid of claim 8, wherein the second intermediate dairy liquid is standardized prior to sterilization such that the stable concentrated dairy liquid has a predetermined concentration level of about 3× to about 5×.

22. The stable concentrated dairy liquid of claim 1, wherein the stable concentrated dairy liquid contains about 0.1 to about 1 percent of trisodium citrate, about 0.1 to about 1 percent sodium chloride, about 1 to 10 percent sugar, and about 0.01 to 0.3 percent flavors and wherein the stable concentrated dairy liquid is resistant to browning for at least about six months of storage under ambient conditions.

23. The stable concentrated dairy liquid of claim 3, wherein the stable concentrated dairy liquid contains about 0.1 to about 1 percent of trisodium citrate, about 0.1 to about 1 percent sodium chloride, about 1 to 10 percent sugar, and about 0.01 to 0.3 percent flavors and wherein the stable concentrated dairy liquid is resistant to browning for at least about six months of storage under ambient conditions.

24. A method of making a stable concentrated dairy liquid, said method comprising:
(1) providing a dairy liquid containing serum proteins and casein proteins;
(2) concentrating the dairy liquid to form a first intermediate dairy liquid having at least 8.5 percent total protein, wherein the concentration is carried out using ultrafiltration with or without diafiltration;
(3) adding a stabilizer selected from a chaotropic agent, a calcium-binding buffer, or other stabilizer which binds calcium and a mouthfeel enhancer selected from sodium chloride, potassium chloride, sodium sulfate, and mixtures thereof to the first intermediate dairy liquid to form a second intermediate dairy liquid, the stabilizer and the mouthfeel enhancer being in amounts and in a ratio which are effective to prevent gelation during sterilization of the second intermediate dairy liquid, effective to prevent gelation during storage of the stable concentrated dairy liquid and effective to provide an improved mouthfeel over a similar dairy liquid without the stabilizer and mouthfeel enhancer; and
(4) sterilizing the second intermediate dairy liquid at a temperature and for a time sufficient to obtain the stable concentrated dairy liquid, wherein the stable concentrated dairy liquid has a Fo of at least 5,
and wherein the stable concentrated dairy liquid is resistant to gelation for at least about six months of storage under ambient conditions.

25. The method of claim 24, wherein the stabilizer is added at about 0.1 to about 1 percent, and the stabilizer is selected from the group consisting of disodium phosphate, dipotassium phosphate, disodium citrate, trisodium citrate, and mixtures thereof; and wherein the mouthfeel enhancer is added at about 0.1 to about 1 percent and the mouthfeel enhancer is selected from the group consisting of sodium chloride, potassium chloride, sodium sulfate, and mixtures thereof.

26. The method of claim 25, wherein the stabilizer is disodium phosphate or trisodium citrate and the mouthfeel enhancer is sodium chloride.

27. The method of claim 24, wherein the stable concentrated dairy liquid is packaged in a sealed container suitable for use in a beverage making machine.

28. The method of claim 25, wherein the stable concentrated dairy liquid is packaged in a sealed container suitable for use in a beverage making machine.

29. The method of claim 24, wherein the second intermediate dairy liquid is standardized prior to sterilization such that the stable concentrated dairy liquid has a predetermined concentration level of about 3× to about 5×.

30. The method of claim 25, wherein the second intermediate dairy liquid is standardized prior to sterilization such that the stable concentrated dairy liquid has a predetermined concentration level of about 3× to about 5×.

31. The method of claim 24, wherein the stable concentrated dairy liquid contains about 0.1 to about 1 percent of trisodium citrate, about 0.1 to about 1 percent sodium chloride, about 1 to 10 percent sugar, and about 0.01 to 0.3 percent flavors.

32. The method of claim 25, wherein the stable concentrated dairy liquid contains about 0.1 to about 1 percent of trisodium citrate, about 0.1 to about 1 percent sodium chloride, about 1 to 10 percent sugar, and about 0.01 to 0.3 percent flavors.

33. The method of claim 24, wherein the stable concentrated dairy liquid contains less than 1 percent lactose and is resistant to browning for at least about six months of storage under ambient conditions.

34. The method of claim 25, wherein the stable concentrated dairy liquid contains less than 1 percent lactose and is resistant to browning for at least about six months of storage under ambient conditions.

35. The method of claim 24, wherein the ratio of stabilizer to mouthfeel enhancer is from about 1:3 to about 3:1.

36. The method of claim 35, wherein the ratio of stabilizer to mouthfeel enhancer is from about 1:2 to about 2:1.

* * * * *